United States Patent
Venter

(10) Patent No.: US 10,393,028 B1
(45) Date of Patent: Aug. 27, 2019

(54) GEARED COMPRESSOR FOR GAS TURBINE ENGINE

(71) Applicant: ROLLS-ROYCE DEUTSCHLAND LTD & CO KG, Dahlewitz (DE)

(72) Inventor: Gideon Daniel Venter, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 0 days.

(21) Appl. No.: 16/121,305

(22) Filed: Sep. 4, 2018

Related U.S. Application Data

(63) Continuation of application No. 14/060,094, filed on Oct. 22, 2013.

(30) Foreign Application Priority Data

Oct. 31, 2012 (GB) .................................. 1219544.2

(51) Int. Cl.
*F02C 7/36* (2006.01)
*F02K 3/04* (2006.01)
(Continued)

(52) U.S. Cl.
CPC .............. *F02C 7/36* (2013.01); *F02C 3/064* (2013.01); *F02C 3/067* (2013.01); *F02C 3/107* (2013.01);
(Continued)

(58) Field of Classification Search
CPC ... F02K 3/04; F02K 3/06; F02K 3/072; F02K 3/062; F02K 3/065; F05D 2260/40311;
(Continued)

(56) References Cited

U.S. PATENT DOCUMENTS 4,005,575 A * 2/1977 Scott .......................... F02C 9/18
415/61
4,827,712 A * 5/1989 Coplin ...................... F02K 3/06
415/210.1
(Continued)

FOREIGN PATENT DOCUMENTS

DE          3933776 A1 *  4/1991  .............. F02C 3/067
DE       39 33 776 C2     8/1991
(Continued)

OTHER PUBLICATIONS

Feb. 16, 2018 extended European Search Report issued in European Application No. 13005088.3.
(Continued)

*Primary Examiner* — Gerald L Sung
*Assistant Examiner* — Marc J Amar
(74) *Attorney, Agent, or Firm* — Oliff PLC

(57) ABSTRACT

A booster assembly for a gas turbine engine having a first rotor assembly comprising a low pressure turbine drivingly connected to a fan via a first shaft and a second rotor assembly comprising a second turbine drivingly connected to a high pressure compressor via a second shaft. The first and second rotor assemblies are arranged to undergo relative rotation in use about a common axis. The booster assembly comprises a further compressor arranged to be disposed about said common axis between the fan and high-pressure compressor in a direction of flow and a gearing having first and second input rotors and an output rotor. The first input rotor is arranged to be driven by the first rotor assembly and the second input rotor is arranged to be driven by the second rotor assembly such that the output rotor drives the further compressor in dependence upon the difference in rotational speed between the first and second rotor assemblies.

19 Claims, 5 Drawing Sheets

(51) Int. Cl.
*F02C 3/113* (2006.01)
*F02C 3/107* (2006.01)
*F02C 3/06* (2006.01)
*F02K 3/06* (2006.01)
*F02C 3/067* (2006.01)
*F02C 7/32* (2006.01)

(52) U.S. Cl.
CPC ............... *F02C 3/113* (2013.01); *F02C 7/32* (2013.01); *F02K 3/04* (2013.01); *F02K 3/06* (2013.01); *F05D 2260/40311* (2013.01)

(58) Field of Classification Search
CPC .......... F02C 3/067; F02C 3/107; F02C 3/113; F02C 7/36
See application file for complete search history.

(56) References Cited

U.S. PATENT DOCUMENTS

| | | | | |
|---|---|---|---|---|
| 5,010,729 A * | 4/1991 | Adamson | ................ | F02C 3/067 416/129 |
| 5,687,561 A * | 11/1997 | Newton | ............... | B64D 41/007 60/226.1 |
| 7,363,757 B2 * | 4/2008 | Loisy | ...................... | F02C 3/113 60/226.1 |
| 7,552,582 B2 * | 6/2009 | Eick | .......................... | F02C 3/107 60/39.163 |
| 7,656,054 B2 * | 2/2010 | Lardellier | ................. | F02C 7/32 290/40 C |
| 7,690,185 B2 * | 4/2010 | Linet | ....................... | F02C 3/113 60/39.163 |
| 7,752,836 B2 * | 7/2010 | Orlando | .................. | F02C 3/067 60/268 |
| 7,791,235 B2 * | 9/2010 | Kern | ........................ | F01D 15/10 310/103 |
| 7,833,126 B2 * | 11/2010 | Venter | ..................... | F01D 15/10 477/39 |
| 7,882,693 B2 * | 2/2011 | Schilling | ................. | F02C 3/107 60/204 |
| 7,997,085 B2 * | 8/2011 | Moniz | ..................... | F01D 15/10 60/778 |
| 8,191,352 B2 * | 6/2012 | Schilling | ................. | F02C 3/107 415/65 |
| 8,291,715 B2 * | 10/2012 | Libera | ....................... | F02C 6/08 60/39.183 |
| 9,021,778 B2 * | 5/2015 | Kupratis | ................... | F02C 7/36 60/39.162 |
| 2003/0119620 A1 * | 6/2003 | Zwilling | ................. | F16H 3/724 475/219 |
| 2006/0272313 A1 * | 12/2006 | Eick | ......................... | F02C 3/107 60/39.63 |
| 2007/0087892 A1 * | 4/2007 | Orlando | .................. | F02C 3/067 475/348 |
| 2007/0130959 A1 * | 6/2007 | Linet | ....................... | F02C 3/113 60/802 |
| 2007/0137219 A1 | 6/2007 | Linet et al. | | |
| 2008/0006023 A1 * | 1/2008 | Lardellier | ................ | F02C 7/32 60/226.1 |
| 2008/0047376 A1 * | 2/2008 | Venter | ..................... | F01D 15/10 74/15.2 |
| 2008/0060341 A1 * | 3/2008 | Loisy | ...................... | F02C 3/113 60/226.1 |
| 2008/0072568 A1 * | 3/2008 | Moniz | ..................... | F01D 15/10 60/226.1 |
| 2008/0098712 A1 | 5/2008 | Sheridan | | |
| 2008/0120839 A1 * | 5/2008 | Schilling | ................. | F02C 3/107 29/888.02 |
| 2008/0149445 A1 * | 6/2008 | Kern | ........................ | F01D 15/10 192/3.56 |
| 2008/0211237 A1 | 9/2008 | Berenger | | |
| 2009/0314002 A1 * | 12/2009 | Libera | ....................... | F02C 6/08 60/778 |
| 2010/0034644 A1 * | 2/2010 | Scricca | .................. | F01D 11/003 415/173.1 |
| 2010/0154384 A1 * | 6/2010 | Schilling | ................. | F02C 3/107 60/268 |
| 2010/0192595 A1 * | 8/2010 | Orlando | .................... | F02C 7/36 60/792 |
| 2010/0223904 A1 * | 9/2010 | Edwards | ................. | F02C 3/067 60/224 |
| 2012/0329593 A1 * | 12/2012 | Larrabee | ............... | B64C 39/024 475/5 |
| 2013/0000323 A1 * | 1/2013 | Kupratis | ................... | F02C 7/36 60/801 |
| 2013/0247539 A1 * | 9/2013 | Hoppe | ...................... | F02C 7/32 60/39.15 |
| 2014/0064915 A1 * | 3/2014 | Masson | ................... | F02C 3/113 415/1 |
| 2017/0247107 A1 | 8/2017 | Hauer et al. | | |

FOREIGN PATENT DOCUMENTS

| | | | |
|---|---|---|---|
| EP | 1 777 406 A2 | 4/2007 | |
| EP | 1 933 017 A2 | 6/2008 | |
| EP | 2 009 269 A2 | 12/2008 | |
| WO | 2012/123684 A1 | 9/2012 | |
| WO | WO 2012123684 A1 * | 9/2012 | ............. F02C 3/113 |

OTHER PUBLICATIONS

Feb. 21, 2013 Search Report issued in British Patent Application No. 1219544.2.

Nov. 21, 2018 U.S. Office Action Issued in U.S. Appl. No. 16/121,253.

* cited by examiner

US 10,393,028 B1

GEARED COMPRESSOR FOR GAS TURBINE ENGINE

CROSS-REFERENCE TO RELATED APPLICATIONS

This application is a continuation application of U.S. patent application Ser. No. 14/060,094, filed on Oct. 22, 2013, which is based upon and claims the benefit of priority from British Patent Application Number GB1219544.2 filed 31 Oct. 2012. The entire contents of each of the above applications are incorporated by reference.

BACKGROUND OF THE INVENTION

1. Field of the Invention

The present invention concerns compressors for gas turbine engines.

2. Description of the Related Art

With reference to FIG. 1, a conventional ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement. In one known two-shaft configuration, the low-pressure turbine drives the fan only and the desired compression ratio into the combustor is achieved by a multi-stage high-pressure compressor. However it is generally desirable to increase the speed of the high-pressure compressor as far as possible in order to increase efficiency. The maximum speed that can be achieved by the high-pressure compressor is limited by the compressor blade tip diameter of the forward stages of the compressor, which have larger diameter than the smaller rearward stages. Furthermore the axial loads on the high-pressure spool for such a configuration are large.

Accordingly it is generally known that a so-called booster may provided in a two-shaft engine configuration in order to provide further compression of the core airflow in between the fan and the high-pressure compressor. The booster may driven by the low pressure turbine/shaft and thus rotates at the same speed as the fan. Such a booster has limited efficiency and offers only a limited compression ratio, requiring a large number of booster compressor stages, thereby carrying relatively large penalties in terms of cost, weight, engine length, and aerodynamic drag. The axial load relief for the high-pressure spool is also limited.

As a solution to the above deficiencies it is known to provide a booster driven directly by the low-pressure turbine but to provide a reduction gearbox between the booster and the fan. This allows the booster and fan to be driven at optimal respective speeds/efficiencies whilst also reducing the axial loading on the high-pressure spool.

However it will be appreciated by the skilled person that the aerodynamic efficiency of the compressors and turbines themselves is only one aspect of operational performance. There are a number of accessories that are typically required to be driven by the engine, comprising for example electrical generators, hydraulic pumps, fuel pumps and oil pumps. There is, in general, increasing demand for electrical power on airframes. However there exists a problem in that, unlike engine-dedicated accessories, the power demands of an airframe are independent of the engine operating conditions, such as the spool speeds. For example an aircraft may require a significant level of power even when the engine is idle or at low speeds.

Aircraft electrical power is conventionally generated by one or more accessory mounted generators such as an Integrated Drive Generator (IDG) and/or Variable Frequency Generator (VFG). The power to such generator(s) is extracted from the high-pressure shaft since the speed variation in that shaft is lower than that of the low-pressure shaft. IDG's feature an integral constant speed drive that ensures the generator operates at a fixed speed over the high-pressure range of operation, thereby ensuring a fixed electrical frequency output. For VFG's control electronics are used to correct frequency variations. The generators must be sized to ensure that the electrical supply meets the aircraft demands at the lowest engine speed settings.

This base level/requirement of power extraction requires that the high-pressure spool speed cannot drop below a lower cut-off value. That cut-off speed is typically higher than a desirable speed at engine idle, during taxi and/or descent during flight. Thus the high-pressure spool is operated at higher speeds to satisfy electrical demands, thereby reducing engine efficiency and increasing thrust when it is not needed (e.g. requiring the application of aircraft brakes on the ground and/or extending the descent phase during flight).

OBJECTS AND SUMMARY OF THE INVENTION

It is an aim of the present invention to provide a geared drive and/or compressor arrangement which can mitigate one or more of the above problems.

According to a first aspect of the invention, there is provided a booster assembly for a gas turbine engine having a first rotor assembly comprising a low pressure turbine drivingly connected to a fan via a first shaft and a second rotor assembly comprising a second turbine drivingly connected to a high pressure compressor via a second shaft, the first and second rotor assemblies arranged to undergo relative rotation in use about a common axis, the booster assembly comprising a further compressor arranged to be disposed about said common axis between the fan and high-pressure compressor in a direction of flow and a gearing having first and second input rotors and an output rotor, the first input rotor arranged to be driven by the first rotor assembly and the second input rotor arranged to be driven by the second rotor assembly such that the output rotor drives the further compressor in dependence upon the difference in rotational speed between the first and second rotor assemblies.

The further compressor may comprise a plurality of circumferential arrays of compressor blades in axial succession. The further compressor may comprise a compressor drum, for example comprising a series of discs attached together for co-rotation, and a casing. The casing may comprise a plurality of circumferential arrays of stator vanes depending radially inwardly therefrom.

The compressor may define an annular flow passage, for example between a rotor drum and a casing portion thereof.

The driving of a booster in accordance with the present invention allows the booster to rotate at a speed greater than that of the low-pressure spool (i.e. at a speed between that of the low-pressure and high-pressure spools). Thus the rotational speed of the booster at idle or low engine speeds is increased above that of a conventional booster arrangement. This can reduce the operating speed range of the booster and improve efficiency.

The gearing may comprise an epicyclic gearing. The gearing may comprise a sun gear and a plurality of planet gears mounted on a planet gear carrier or support.

The gearing may comprise an outer ring gear radially spaced from the sun gear. The planet gears may be interposed between the sun gear and outer ring.

The planet gears may be rotatably mounted on a support/carrier, for example by bearing arrangements. The support may be rotatably mounted for rotation about the common axis. The axes of rotation of the planet gears may be substantially parallel with, but spaced from, the common axis.

In one embodiment, the first input rotor of the gearing comprises a sun gear and/or the second input rotor of the gearing comprises a ring gear. The output rotor may comprise a planet gear support.

In another embodiment, the first input rotor of the gearing comprises a planet gear support and/or the second input rotor of the gearing comprises a ring gear. The output rotor may comprise a sun gear.

In another embodiment, the first input rotor of the gearing comprises a ring gear and/or the second input rotor comprises a sun gear. The output rotor may comprise a planet gear carrier member.

The second input rotor may be integral with or else attached to the second shaft for co-rotation therewith. The second input rotor may comprise an extension portion of the second shaft. The second input rotor may be connected to the second shaft via an intermediate wall or portion which may be angled (obliquely or perpendicular) with respect to the common axis. The second input rotor may be radially outside the second shaft (i.e. of larger diameter than the second shaft).

The first input rotor may be integral with or else attached to the first shaft for co-rotation therewith. The first input rotor may be formed on, or depend from, the first shaft and may comprise an extension portion thereof. The first input rotor may comprise an annular member such as a collar or upstanding wall about the first shaft.

Either or both of the first and second input rotors may have an annular array of gear teeth.

According to one embodiment, the output rotor of the gearing may be further connected to, or drive, an electrical machine, such as a generator. The output rotor may be connected to or else integral with a rotor of the electrical machine. The output rotor may comprise an extension portion forming a part of the electrical machine. The electrical machine rotor may comprise one or more magnets.

The electrical machine may comprise a stator or else a further rotor. The stator or further rotor may comprise one or more electrical conducting members (e.g. coils) in which a current is induced by the relative rotation of the rotor. The stator or further rotor may be concentrically arranged with the electrical machine rotor. In the example of a further rotor, the further rotor may be driven by the first or second rotor assembly. The further rotor may be driven by the first shaft or an extension portion thereof.

The electrical machine rotor(s) and/or stator may be disposed about the common axis. Said rotor(s) may rotate about said axis.

The extraction of power using examples of the present invention, i.e. to drive a generator and/or accessory gearbox, can help to reduce engine operability problems at low engine speeds. The invention allows electrical power to be derived from the low-pressure spool but with a speed range that is lower than that of the low-pressure spool. Accordingly the generator size is not as large as would typically be required for the low-pressure spool in isolation.

According to one embodiment, the booster assembly comprises a brake for the first rotor assembly and/or second rotor assembly. First and second brakes may be respectively provided.

An electrical machine may be connected to the output rotor. The electrical machine may serve as a starter motor upon braking of the first rotor assembly.

The electrical machine may serve as a generator upon release of the first rotor assembly, for example during normal use, or else when braking the second rotor assembly (e.g. during windmilling).

The invention may beneficially allow alternative starter configurations to those posed in conventional gas turbine engine configurations. Furthermore the invention may avoid the need for long transmission drive trains to conventionally-mounted accessory gearbox mounted generators, which can be prone to dynamic effects (such as torsional dynamic effects) caused by accessory and/or generator loading characteristics.

The output of the gearing of the invention may drive both the further (booster) compressor and also the electrical machine.

According to a second aspect of the invention, there is provided a booster assembly for a gas turbine engine having a first rotor assembly comprising a low pressure turbine drivingly connected to a fan via a first shaft and a second rotor assembly comprising a second turbine drivingly connected to a high pressure compressor via a second shaft, the first and second rotor assemblies arranged to undergo relative rotation in use about a common axis, the booster assembly comprising a further compressor arranged to be disposed about said common axis between the fan and high-pressure compressor in a direction of flow and a gearing having an input rotor arranged to be driven by the first or second rotor assembly and at least one output rotor arranged to drive both the further compressor and an electrical generator in use.

First and second output rotors may be provided to drive the further compressor and electrical generator at different speeds. Alternatively first and second inputs may be provided to the gearing so as to drive both the further compressor and the electrical generator according to the difference in rotational speeds between the first and second rotor assemblies.

According to a third aspect of the invention, there is provided a gas turbine engine comprising the booster assembly of the first or second aspect.

Any of the features defined above in relation to any one aspect of the invention may be applied to any other or further aspect.

The term "co-rotation" as used herein may be considered to mean rotation in a common direction with a common speed.

BRIEF DESCRIPTION OF THE DRAWINGS

Practicable embodiments of the invention are described in further detail below by way of example only with reference to the accompanying drawings, of which.

DETAILED DESCRIPTION OF THE PREFERRED EMBODIMENTS

The present invention derives from the premise that it is possible to drive a booster and/or generator by the difference in relative rotation between the high-pressure and low-pressure spools of a gas turbine engine.

Figure 1:
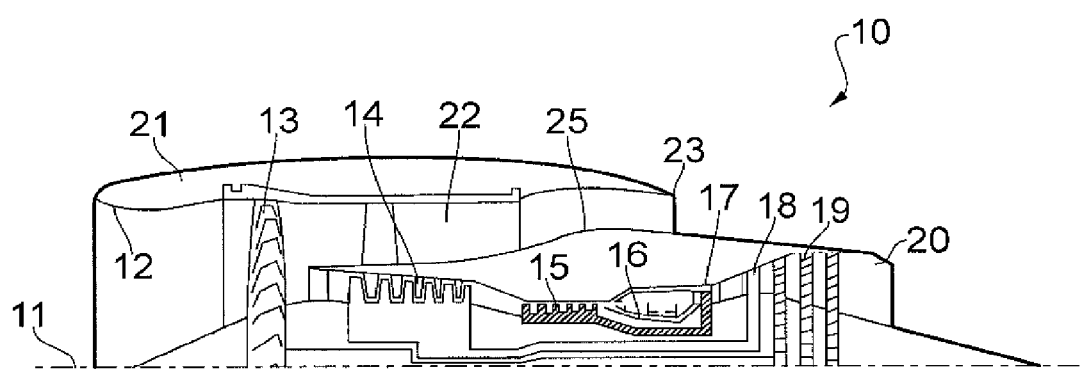
FIG. 1 shows a half-longitudinal section through a gas turbine engine according to the prior art.

Gas turbine engines using the invention may operate substantially in the manner described above in relation to FIG. 1, with the exception that the intermediate-pressure turbine 18 and shaft may be removed. Accordingly the intermediate-pressure compressor 14 may be replaced with a booster assembly driven by a gearing as will be described below.

Figure 2:
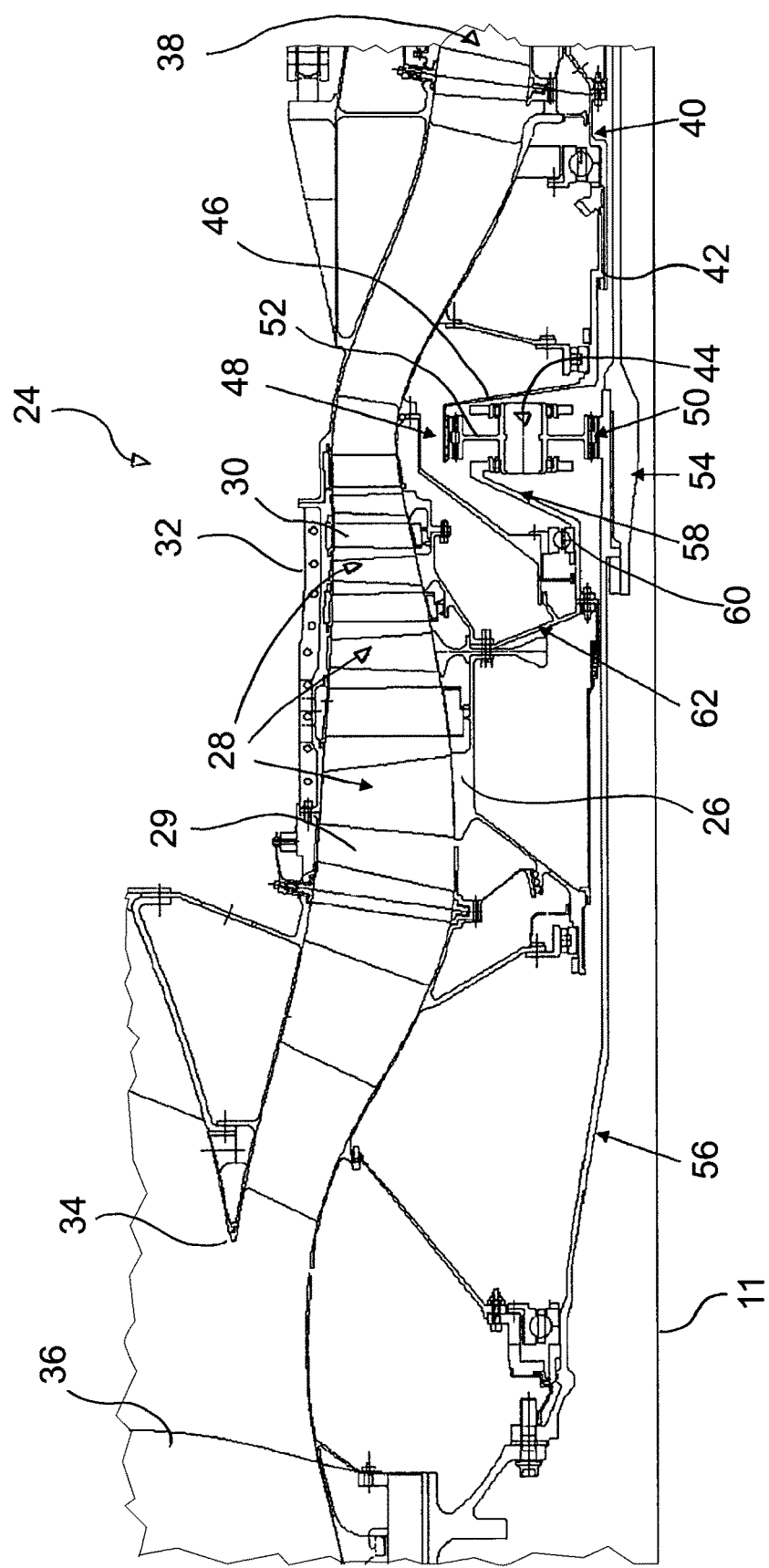
FIG. 2 shows a half-longitudinal section through a compressor according to one example of the invention.

Turning to FIG. 2, there is shown a booster (i.e. compressor) arrangement 24 according to one example of the invention. The compressor portion of the arrangement comprises a rotor drum 26 having a plurality of compressor blades 28 depending radially outwardly therefrom at axially spaced locations. The compressor blades 28 are preferably provided as a plurality of rows or circumferential arrays of blades arranged about axis 11.

The blades extend into an annular compressor passageway 29. The passage is defined as the space between the rotor drum 26 (which defines an inner wall of the passage) and a concentric casing structure 32 (which defines an outer wall of the passage).

The compressor blades, which rotate with the drum in use, are axially spaced and intermediate stator vanes 30 are provided therebetween. The stator vanes depend inwardly from the casing 32. The radially inner ends of the stator vanes may terminate at or immediately adjacent sealing formations on the rotor drum 26 to minimise any leakage from therebetween in use.

The passageway 29 defines a portion of the core flow passage extending from a flow splitter 34 (i.e. downstream of the fan 36) to the high-pressure compressor 38 (only the upstream end of which is shown) and onto the combustor (not shown) in FIG. 2). The compressor is thus in the flow path between the fan and the high-pressure compressor.

The high-pressure compressor is driven by a corresponding high-pressure shaft 40. The high pressure shaft has an extension portion 42 connecting it to an input rotor of a gearing 44. In this embodiment the extension portion comprises a wall 46 or other support formation which is obliquely angled relative to the axis 11 and the remainder of the shaft 40 so as to provide an increase in shaft diameter to accommodate the gearing 44.

The shaft extension portion terminates at a ring gear formation 48 disposed about the axis 11 and having radially-inwardly facing teeth.

The gearing 44 comprises an epicyclic or planet gear arrangement in which a plurality of planet gears 52 are arranged between the radially outer ring gear 48 and a radially inner sun gear 50.

The sun gear is provided as a collar formation on the exterior surface of the low-pressure shaft 54 which extends between the fan 36 and the low-pressure turbine. A portion of the low pressure shaft 54 in concentrically inside the high-pressure shaft 40. However the low pressure shaft 54 extends forwardly of the high pressure shaft in the axial direction.

The low pressure shaft 54 may join with (i.e. may be integrally formed with or attached to) a fan shaft portion 56 which drives the fan in rotation in use.

The sun gear 50 comprises a radially-outwardly facing gear teeth arranged circumferentially about the shaft 54 collar. The sun gear may be formed at a rearward portion of the fan shaft 56 or a forward portion of the low-pressure shaft 54 or at an interface or overlapping region therebetween.

The planet gears 52 each comprise a set of teeth arranged about their circumferential surface. The teeth thus mesh with the teeth of the ring gear 48 and the sun gear 50 concurrently.

The plurality of planet gears are typically provided as a circumferential array of gears angularly spaced (typically equidistantly) about the axis 11 and sun gear 50.

A planet carrier structure 58 holds the planet gears at the desired relative orientation and spacing. The planet carrier comprises one or more bearings arranged to hold each planet gear at the required location, whilst permitting rotation of the planet gears relative thereto. In this embodiment, the planet gears 52 each have a central hub portion which is maintained at fore and aft ends thereof within carrier structure bearings. An intermediate wall connects the hub portion to the outer circumferential wall on which the teeth are formed. The hub portion may be generally tubular in form.

The circumferential surface/wall of each planet gear is circular in section such that the planet gears each comprise a body of revolution about its own axis. The axis of rotation of each planet gear may be parallel with axis 11 but radially spaced therefrom such that each said axis can follow a circular path about axis 11 in use.

The planet carrier structure 58 defines a rotor, which, in this embodiment, comprises an output rotor of the gearing 44. The planet carrier structure is supported relative to the static engine structure by a bearing.

The planet carrier structure is drivingly connected to the compressor rotor by an interconnecting drive arm 62.

The gearing 44 is located in a cavity or enclosure surrounding the low-pressure shaft. The gearing 44 in this embodiment is located between the fan and high-pressure compressor, and preferably towards the aft of the booster compressor or immediately downstream thereof.

In use all of the components of the gearing, namely the gear ring 48, the sun gear 50, the planet gears 52 and the planet carrier 58 are rotatable about the common axis 11. Thus, when the gas turbine engine is in operation, the difference in rotational speed between the high-pressure shaft 40 and the low-pressure shaft 54 drives rotation of the planet gears 52 between the ring gear 48 and the sun gear 50. The planet gears in turn cause rotation in the planet carrier 58 about the axis 11, which thus drives rotation of the compressor arrangement 24 such that it functions as a booster.

The speed of rotation of the booster is thus adjusted in line with the input conditions according to the low and high-pressure rotors.

The relative dimensions of the ring gear, planet gears and sun gear are selected to ensure optimal speed requirements of the booster can be achieved. Thus the booster may operate at optimal aerodynamic conditions, wherein the optimal working line is matched with that of the high-pressure compressor. Also the gearing can be additionally or alternatively tailored to ensure that the speed variation of the booster (i.e. the gearing output rotor) between idle and maximum speed lies within an acceptable range, for example for driving an electrical machine as will be described below.

Furthermore the use of a booster configuration as shown in any of the embodiments of the invention can provide an increase in inlet pressure to the high-pressure compressor over that of a conventional two-shaft engine configuration (i.e. more akin to that of a three-shaft engine configuration). This enables a reduction in high-pressure compressor stages and a corresponding reduction in core engine size, thereby allowing the high-pressure spool to operate at increased rotational speeds.

Figure 3:
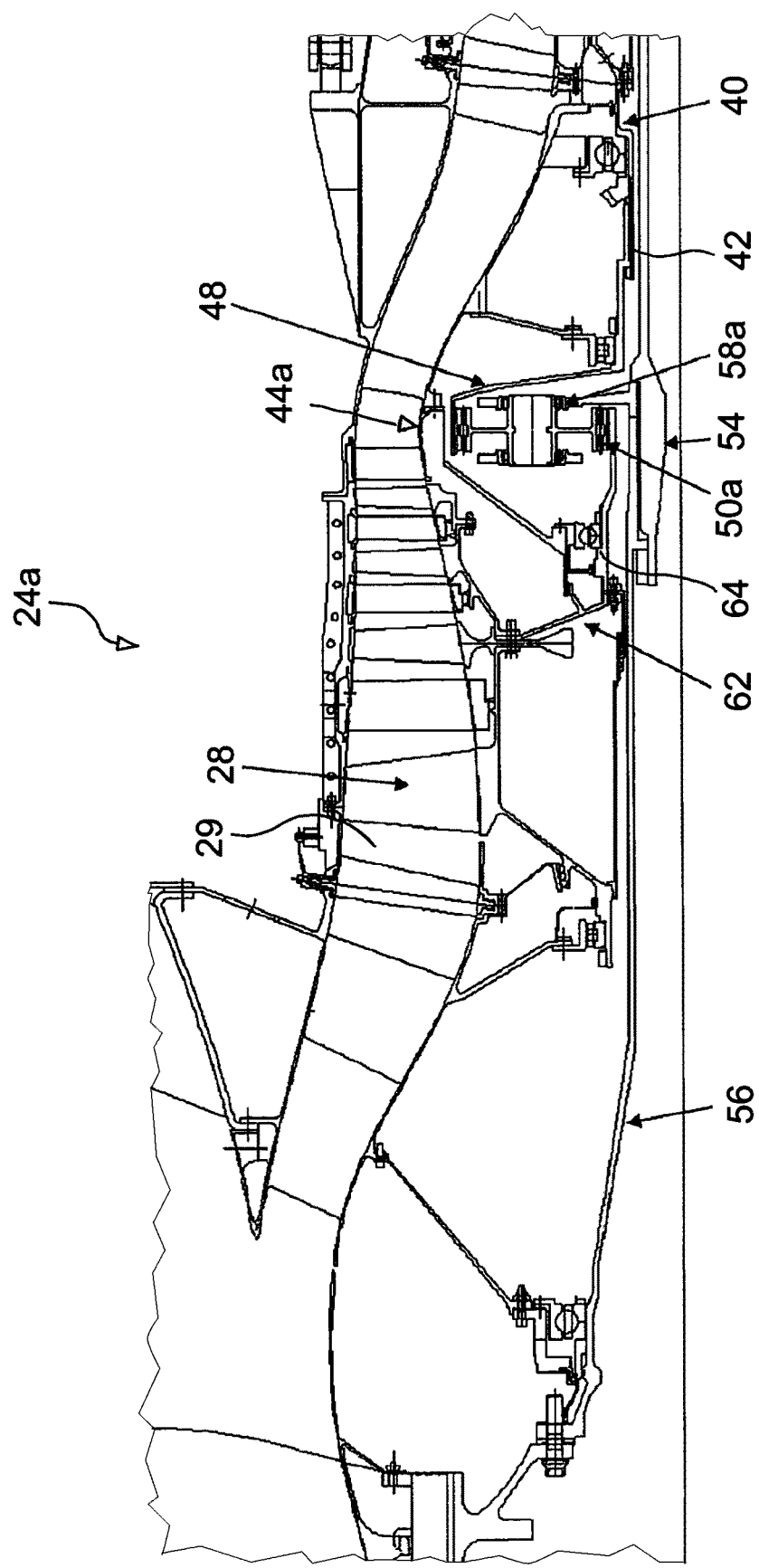
FIG. 3 shows a half-longitudinal section through a compressor according to a second example of the invention.

Turning now to FIG. 3, there is shown a further embodiment which is similar to the embodiment of FIG. 2 with the exception that the input and output rotors are drivingly connected to different portions of the epicyclic gearbox. In the embodiment of FIG. 3, the booster compressor 24a is drivingly connected to the sun gear 50a, for example by a short intermediate shaft 64. The sun gear may thus be formed as a collar about the intermediate shaft 64. The intermediate shaft and/or sun gear may be supported relative to the static engine structure by bearing 66.

The planet carrier 58a in FIG. 3 depends from (i.e. is supported by) the low-pressure shaft 54 and may be connected thereto by an intermediate wall or arm formation. The ring gear arrangement 48 is substantially unchanged and is driven by the high-pressure shaft 40. Thus the ring gear and planet bearing carrier provide input rotors, whilst the sun gear comprises an output rotor.

Figure 4:
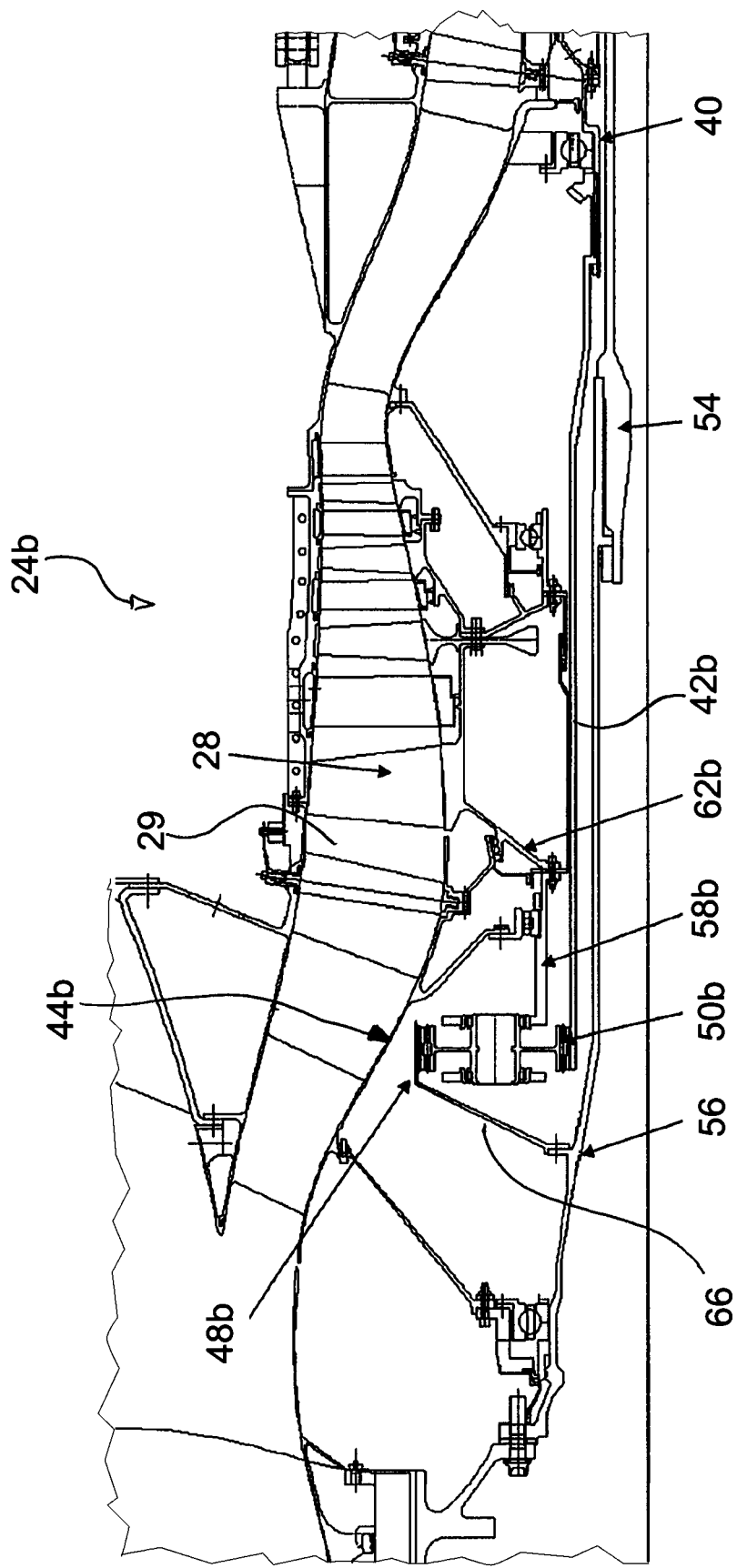
FIG. 4 shows a half-longitudinal section through a compressor according to a third example of the invention.

In FIG. 4 there is shown a further embodiment which is similar to the embodiment of FIG. 2 or 3 with the exception that the input and output rotors are drivingly connected to different portions of the epicyclic gearbox. In the embodiment of FIG. 4, the booster compressor 24b is drivingly connected to the planet carrier 58b, for example which may comprise a short intermediate shaft portion. The booster drive arm 62b thus connects the planet carrier to the compressor drum. The planet carrier may be supported relative to the engine static structure by a bearing arrangement.

The sun gear 50b in this embodiment is driven by the high pressure shaft 40 and may be formed as a collar about the high pressure shaft extension portion 42b.

The ring gear 48b in FIG. 4 depends from (i.e. is supported by) the low-pressure shaft 54 and may be connected thereto by an intermediate wall or arm formation 66.

In the embodiment of FIG. 4, the gearing 44b may be shifted forward such that it is in front of the booster compressor 24b in an axial direction. Accordingly the high-pressure shaft extension 42b may be elongated and the ring gear may be supported by the fan shaft 56. The gearing may be mounted within a cavity or housing surrounding the low-pressure shaft downstream of the fan, for example within or adjacent the front bearing housing of the engine.

By virtue of the different embodiments shown in FIGS. 2-4, it can be seen that the booster can be driven by any epicyclic gearing configuration in which all primary components are rotating and having any two input rotors driving an output rotor via the planet gears. Thus any of the ring gear, planet carrier and sun gear can be drivingly connected to any of the high-pressure, low pressure and booster output as required. However certain configurations are considered to provide certain benefits (i.e. offering better drive gear ratios and/or mounting configurations) in different engine scenarios.

In developments of the basic concept of the invention, the epicyclic arrangement can provide a speed inversion characteristic that allows the booster to operate at relatively higher speed at lower high and low-pressure spool speeds (i.e. at lower engine speeds) and at a relatively lower speed at higher engine speeds. In any embodiment of the invention there may be defined a normal mode of use in which the booster operates at a speed between that of the low-pressure and high-pressure rotor speeds (e.g. at cruise). A second mode of use may be defined, which may comprise a reduced engine speed (e.g. an idle speed), in which the booster speed may be increased relative to the high-pressure spool speed.

Also it has been found that by using a helical tooth profile within the gearing, for certain epicyclic gearbox arrangements, the meshing teeth in the gearbox the tensile axial loading between the low-pressure shaft and the booster can be at least partially counter-acted, this can reduce the effective axial loading which needs to be borne by the low-pressure spool support system, e.g. the LP location bearing.

Power can be extracted according to any of the above examples of the invention from both the high and low-pressure spools so as to improve engine operability, especially at low engine speeds. Accordingly the invention has been found to offer a beneficial rotor arrangement for driving an electrical generator.

In one such embodiment a conventional accessory gearbox and/or generator configuration may be driven by the gearing output/booster instead of by the high-pressure shaft alone. In such an arrangement a radial and/or angled drive shaft (e.g. via a step-aside gearbox) may be provided as would be understood by the person skilled in the art in order to drive an accessory gearbox mounted in the nacelle.

However in a further embodiment, an electrical machine may be integrated with the output of the gearbox such that it is driven directly thereby. In any of the above-described embodiments, the gearbox output may comprise a rotor of the electrical machine such that the electrical machine is mounted for rotation about the engine axis 11, rather than being offset therefrom.

Figure 5:
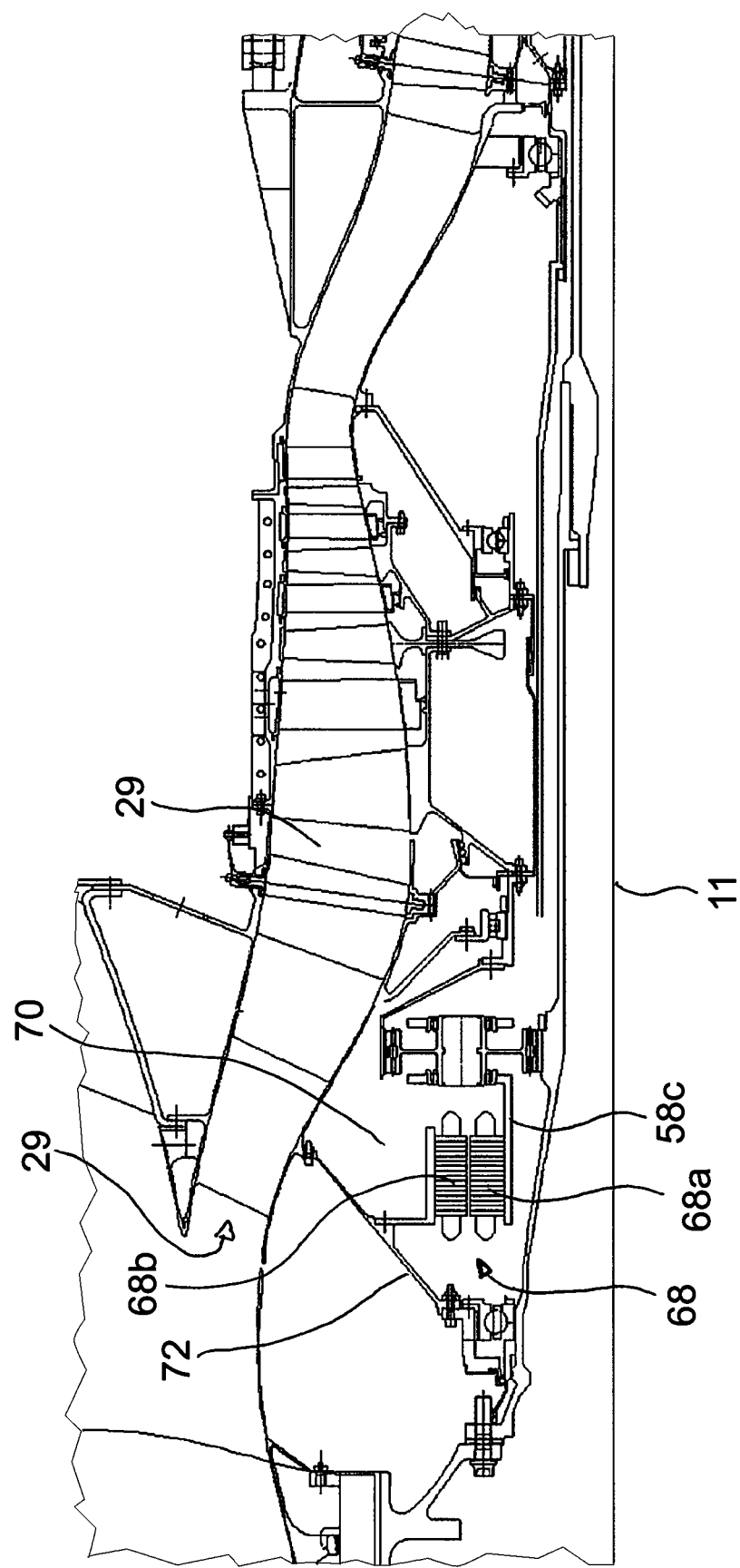
FIG. 5 shows a half-longitudinal section through a compressor according to a further example of the invention, comprising an electrical machine.

An example of such an electrical machine 68 is shown in FIG. 5. The electrical machine in this embodiment is driven by the planet gear carrier structure 58c so as to induce rotation between the rotor 68a and stator 68b portions of the electrical machine. In such an embodiment the stator 68b may be supported by a static portion of the engine structure.

The rotor 68a and stator 68b may comprise any conventional rotor or stator of an electric machine, suitable for use in a gas turbine engine, and may comprise for example one or more permanent magnets or one or more current-carrying conductors in the form of coils. Either such rotor or stator may be arranged about engine axis 11.

The electrical machine 68, e.g. the magnet and coil assembly thereof, may be mounted at an axial location between the fan 36 and booster compressor 24, 24a, 24b or HP compressor 38. The electrical machine may be mounted radially inwardly of a bypass duct and/or core engine air intake. The electrical machine may be mounted within a cavity 70 located radially between the engine axis 11 and the annular passage 29 forming the core engine air intake.

The electrical machine may be supported relative to a wall of cavity 70, for example via an internal support member 72.

In alternative embodiments of the invention for use in driving an electrical machine, the circumferential arrangement of rotor 68a and stator 68b may be reversed such that the stator may be radially inside of the rotor.

The electrical machine rotor may be driven by the difference in relative rotational speeds between the high and low pressure spools of the gas turbine engine. Whilst the embodiment of FIG. 5 shows the electrical machine rotor being driven by the planet gear carrier 58c, it will be appreciate that the planet gear arrangement inputs and output could alternatively be arranged, for example as indicated in FIGS. 2-4, such that the electrical machine could alternatively be driven by the outer ring gear or inner sun gear.

The electrical machine in any embodiment can operate as an electrical generator during a normal mode of operation of the engine. However, the electrical machine can also be used as a starter motor during engine start-up, i.e. to drive the high-pressure shaft in rotation using an electrical supply to the stator coils.

Additionally or alternatively to the generator described in relation to FIG. 5, the gearing output of the invention may be used to drive other accessories, such as for example a pump (e.g. an oil pump). Thus pumps may be at least partially driven by the fan.

The principles of the present invention may be applied within a gas turbine engine having two co-rotating or contra-rotating spools.

Whilst the present invention finds a particular application in aircraft engines, the various available gas turbine engine configurations achievable under the present invention may be adapted to suit any conventional gas turbine engine application, which may include aerospace, marine, power generation amongst other propulsion or industrial pumping applications.

What is claimed is:

1. A gas turbine engine comprising:
   a first rotor assembly comprising a low pressure turbine drivingly connected to a fan via a first shaft;
   a second rotor assembly comprising a second turbine drivingly connected to a high pressure compressor via a second shaft, the first and second rotor assemblies arranged to undergo relative rotation in use about a common axis, and
   a booster assembly having:
      a further compressor arranged to be disposed about said common axis between the fan and high-pressure compressor in the direction of flow; and
      a gearing having first and second input rotors and an output rotor, the first input rotor arranged to be driven by the first rotor assembly and the second input rotor arranged to be driven by the second rotor assembly, wherein
   the gearing is a mechanical epicyclic gearing comprising at least one mechanical coupling including gears and teeth, and
   the first input rotor comprises a ring gear, the second input rotor comprises a sun gear and the output rotor comprises a planet gear carrier member.

2. The gas turbine engine according to claim 1, wherein the first or second input rotor comprises an extension portion of the respective first or second shaft.

3. The gas turbine engine according to claim 1, wherein the first or second input rotor is connected to the respective first or second shaft by an intermediate wall or arm which is angled with respect to the common axis.

4. The gas turbine engine according to claim 1, wherein the first rotor assembly and the second rotor assembly are co-rotating.

5. The gas turbine engine according to claim 1, wherein the output rotor of the gearing is drivingly connected to an electrical machine.

6. The gas turbine engine according to claim 5, wherein the electrical machine is driven by the output rotor in a generator mode of operation and/or is arranged to drive the output rotor in a starter motor mode of operation.

7. The gas turbine engine according to claim 5, wherein the output rotor is connected to or integral with a rotor of the electrical machine.

8. The gas turbine engine according to claim 7, wherein the electrical machine rotor comprises one or more magnets.

9. The gas turbine engine according to claim 5, wherein the electrical machine is disposed about the common axis.

10. The gas turbine engine according to claim 5, further comprising a brake for any or any combination of the first rotor assembly, second rotor assembly, the first input rotor and/or the second input rotor.

11. A gas turbine engine comprising:
   a first rotor assembly comprising a low pressure turbine drivingly connected to a fan via a first shaft;
   a second rotor assembly comprising a second turbine drivingly connected to a high pressure compressor via a second shaft, the first and second rotor assemblies arranged to undergo relative rotation in use about a common axis, and
   a booster assembly having:
      a further compressor arranged to be disposed about said common axis between the fan and high-pressure compressor in the direction of flow; and
      a gearing having first and second input rotors and an output rotor, the first input rotor arranged to be driven by the first rotor assembly and the second input rotor arranged to be driven by the second rotor assembly, wherein
   the gearing is a mechanical epicyclic gearing comprising at least one mechanical coupling including gears and teeth,
   the first input rotor comprises a planet gear carrier member, the second input rotor comprises a sun gear and the output rotor comprises a ring gear,
   the output rotor drives the further compressor, and
   the first rotor assembly and the second rotor assembly are contra-rotating.

12. The gas turbine engine according to claim 11, wherein the first or second input rotor comprises an extension portion of the respective first or second shaft.

13. The gas turbine engine according to claim 11, wherein the first or second input rotor is connected to the respective first or second shaft by an intermediate wall or arm which is angled with respect to the common axis.

14. The gas turbine engine according to claim 11, wherein the output rotor of the gearing is drivingly connected to an electrical machine.

15. The gas turbine engine according to claim 14, wherein the electrical machine is driven by the output rotor in a generator mode of operation and/or is arranged to drive the output rotor in a starter motor mode of operation.

16. The gas turbine engine according to claim 14, wherein the output rotor is connected to or integral with a rotor of the electrical machine.

17. The gas turbine engine according to claim 16, wherein the electrical machine rotor comprises one or more magnets.

18. The gas turbine engine according to claim 14, wherein the electrical machine is disposed about the common axis.

19. The gas turbine engine according to claim 14, further comprising a brake for any or any combination of the first rotor assembly, second rotor assembly, the first input rotor and/or the second input rotor.

* * * * *